E. V. HARTFORD.
SHOCK ABSORBER FOR VEHICLE SUSPENSION SPRINGS.
APPLICATION FILED OCT. 27, 1915.
1,304,970.   Patented May 27, 1919.
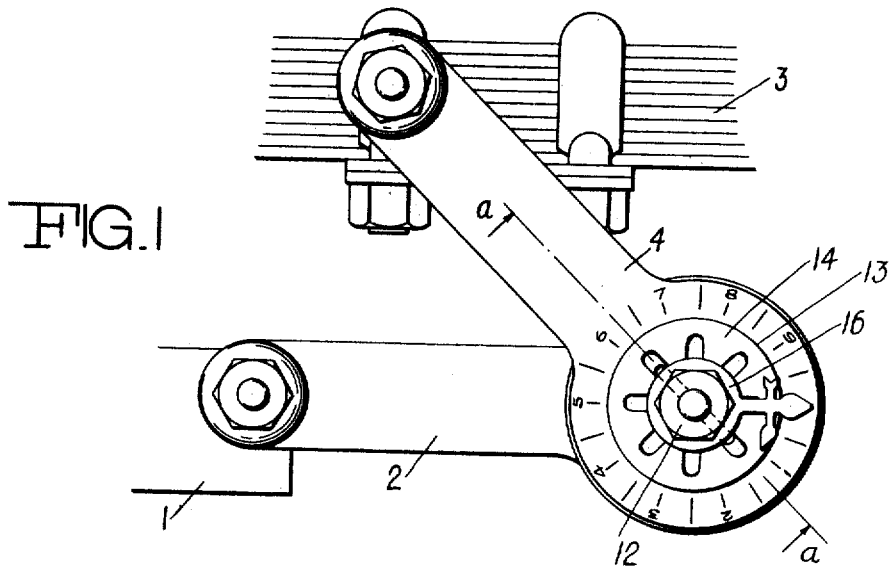
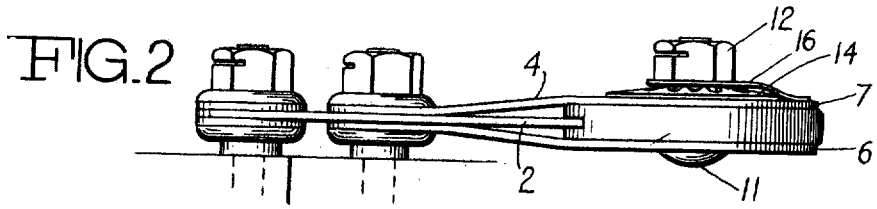
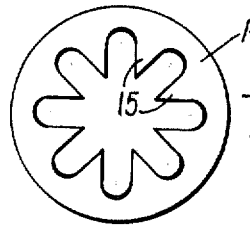 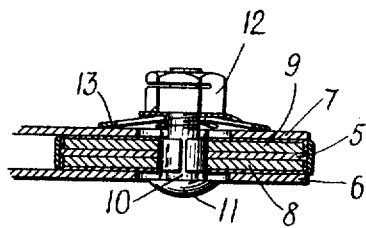
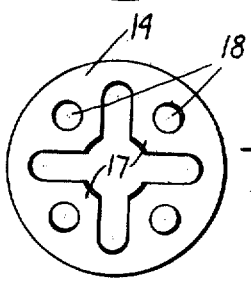

UNITED STATES PATENT OFFICE.

EDWARD VASSALLO HARTFORD, OF DEAL, NEW JERSEY.

SHOCK-ABSORBER FOR VEHICLE SUSPENSION-SPRINGS.

1,304,970.  Specification of Letters Patent.  Patented May 27, 1919.

Application filed October 27, 1915. Serial No. 58,088.

*To all whom it may concern:*

Be it known that I, EDWARD VASSALLO HARTFORD, a citizen of the United States, residing at Deal, in the county of Monmouth and State of New Jersey, have invented certain new and useful Improvements in Shock-Absorbers for Vehicle Suspension-Springs, of which the following, taken in connection with the accompanying sheet of drawings, is a full and concise description thereof.

My present invention relates particularly to certain improved tensioning devices for friction shock absorbers commonly associated with the running gear and suspension springs of a vehicle, for the purpose of modifying or dampening the vibration of the latter.

In my co-pending application, Serial No. 263,307, filed June 1, 1905, I have disclosed a spider-shaped spring in connection with a friction shock absorber comprising a plurality of relatively flat, closely associated disks separated by suitable friction material, said spider-shaped spring bearing upon one of the outermost disks, and the entire assembly being held together by a bolt and nut, by means of which the tension upon the spider spring may be adjusted so that more or less frictional resistance may be created to retard the relative rotation of the disks under the action of the vehicle suspension spring. In this construction the spring pressure is applied at distributed and equidistant points, dependent upon the number of prongs or feet with which the tensioning spring is provided.

It is the object of my present invention to improve upon this construction, and I have to this end devised a tensioning spring which will distribute and apply uniformly a constant degree of pressure against the outermost disk with which it contacts at a zone which is concentric with the perimeter of the disks, thus increasing the effectiveness of a device of a given size for this purpose.

In the annexed drawings, forming a part of this specification, Figure 1 is a view in side elevation of a friction disk shock absorber embodying the features of my present invention, said shock absorber being shown in operative position associated with the running gear and vehicle suspension spring (fragmentary portions of the latter being shown).

Fig. 2 is a view in top plan elevation, thereof.

Fig. 3 is a cross-sectional view taken on lines A—A of Fig. 1.

Fig. 4 is a top plan view of the tensioning spring; and

Fig. 5 is a similar view of a modification thereof.

Referring to the drawings in detail, the numeral 1 indicates the axle or portion of the running gear to which the arm 2 of the shock absorber is attached, and 3 the vehicle suspension spring to which the other arm 4 of the shock absorber is attached. The arm 2 terminates in a flat, circular disk 5, while the arm 4, which is of bifurcated construction, terminates in disks of like character 6 and 7. The disks forming a part of the arm 2 are interposed between the disks 6 and 7, so that the arms when operating produce a scissors-like effect, partial rotative movement being imparted to the disks in order to produce their dampening function.

In order to increase the frictional efficiency of shock absorbers of this character, disks of friction material, 8 and 9, are interposed between the operating faces of the disks.

In order to closely associate the disks and hold them in operative position, they are provided with a centrally-located aperture through which a binding bolt 10 is arranged, this binding bolt being provided with a head 11 at one end and an adjustable binding nut 12 at the other end.

Between the nut 12 and disk 7 is arranged the tensioning spring device 13. This tensioning device comprises an articulated washer-like disk having an outer uninterrupted annular portion 14, and inwardly thereof, radially extending prongs or projections 15, slanting gradually upwardly so as to produce a dished effect, as clearly shown in Fig. 3. Superimposed upon the tensioning device, and interposed between it and the binding nut 12, is a pressure distributing plate or washer 16, suspended or held upon the ends of the prongs 15 of the tensioning device, so that by adjusting the nut 12 more or less tension may be put upon these prongs and transmitted therethrough to the tensioning zone 14 of the device, said tension being transmitted and distributed to the disks equally throughout that concentric portion of the same upon which this portion of the tension device bears, that is, at a zone near the outer periphery of the disk where the greatest outer movement of the disks takes place.

In Fig. 5 I have shown a modified form of a tensioning washer, in which four spring prongs 17 are employed. In order to add to the resiliency of these prongs the metal is removed by punching openings at 18. In both instances these forms of spring tension devices will distribute the pressure equally in an uninterrupted manner annularly upon the outermost portions of the disks where the greatest movement therebetween takes place, thus applying such pressure most effectively.

Furthermore, it will be observed that the zone at which the spring tension is applied is constant and non-shiftable. It, therefore, matters not what degree of pressure is applied to the spring in different sizes of shock absorbers to meet varying conditions. The pressure in all cases will be applied to the disks at the most effective zone, thus securing a maximum of efficiency. This is due to the fact that the tensioning spring is not expansible.

Having thus described my invention, what I claim as new herein and desire to secure by Letters Patent, is:—

1. In a shock absorber, the combination of a plurality of friction disks, of a tensioning device having a non-expansible uninterrupted outer annular portion bearing upon one of the outermost friction disks, and a plurality of inwardly-directed spring fingers projecting above the plane of the uninterrupted annular portion, and means for holding said disks in closely associated position, said means coöperating with the inwardly-directed spring fingers to regulate the tension of the member and control the degree of reluctance to movement of the disks.

2. In a shock absorber, the combination of a plurality of friction disks, a tension device having a non-expansible uninterrupted outer annular portion, and an inner yieldable portion raised above the plane of the outer annular portion, and means for holding the disks and tensioning device in closely associated position, said means being operable to regulate the tension of the tensioning device to control the degree of reluctance to movement of the disks.

3. In a shock absorber, the combination of a plurality of friction disks, a tension device having a non-expansible uninterrupted outer annular portion, and an inner yieldable portion raised above the plane of the outer annular portion, means for holding the disks and tensioning device in closely associated position, said means engaging the raised portion of the tensioning device and being operable to regulate the tension of the tensioning device to control the degree of reluctance to movement of the disks.

EDWARD VASSALLO HARTFORD.